United States Patent
Hipple

(10) Patent No.: US 10,876,023 B2
(45) Date of Patent: Dec. 29, 2020

(54) HEAD GASKET CORRECTION COAGULATION

(71) Applicant: Clement R. Hipple, Philadelphia, PA (US)

(72) Inventor: Clement R. Hipple, Philadelphia, PA (US)

( * ) Notice: Subject to any disclaimer, the term of this patent is extended or adjusted under 35 U.S.C. 154(b) by 0 days.

(21) Appl. No.: 16/372,757

(22) Filed: Apr. 2, 2019

(65) Prior Publication Data

US 2019/0309200 A1    Oct. 10, 2019

Related U.S. Application Data

(60) Provisional application No. 62/652,503, filed on Apr. 4, 2018.

(51) Int. Cl.
*C09K 3/12*    (2006.01)

(52) U.S. Cl.
CPC ........................ *C09K 3/12* (2013.01)

(58) Field of Classification Search
CPC ........................................................ C09K 3/12
See application file for complete search history.

(56) References Cited

U.S. PATENT DOCUMENTS

| | | |
|---|---|---|
| 4,708,195 A | 11/1987 | Barks |
| 4,765,629 A | 8/1988 | Barks |
| 4,973,360 A | 7/1990 | Satas |
| 6,159,276 A * | 12/2000 | Barks ............. C09K 3/12 106/33 |
| 6,324,757 B1 * | 12/2001 | Barks ............. C09K 3/12 29/402.02 |
| 6,585,933 B1 * | 7/2003 | Ehrhardt ............. C23F 11/08 252/180 |
| 6,647,622 B2 * | 11/2003 | Hipple ............. C09K 3/12 29/402.01 |
| 6,767,395 B2 | 7/2004 | Erick |
| 6,840,990 B2 | 1/2005 | Gallagher et al. |
| 7,749,560 B2 | 7/2010 | Bell |
| 2001/0042902 A1 | 11/2001 | Wakabayashi et al. |
| 2008/0087195 A1 | 4/2008 | Yoon |
| 2017/0369756 A1 * | 12/2017 | Kodama ............. C23F 11/10 |
| 2019/0177591 A1 * | 6/2019 | Kodama ............. C09K 5/10 |
| 2019/0194516 A1 * | 6/2019 | Kodama ............. C09K 5/10 |

FOREIGN PATENT DOCUMENTS

CN       107267125 A   * 10/2017

* cited by examiner

*Primary Examiner* — Anthony J Green
(74) *Attorney, Agent, or Firm* — Melvin K. Silverman

(57) ABSTRACT

A formulation for sealing warping or cracking head gasket and cooling system, consisting essentially of 20% to 35% by volume of water; 20% to 35% by volume of sodium silicate; 10% to 30% by volume of potassium silicate; 10% to 20% by volume of propylene glycol at pH 8-10; 5% to 10% by volume of citric acid; and 2.5% to 5% by volume of o-hydroxy phenyl triazine. The formulation also consisting of said sodium silicate and potassium silicate have a kinematic viscosity and may further include benzoates, molybdates, alkali metal borates, sodium silicates, potassium silicates, triazoles, acids, boric salts, sodium hydroxides, potassium hydroxides or lithium hydroxides.

8 Claims, No Drawings ardır # HEAD GASKET CORRECTION COAGULATION

REFERENCE TO RELATED APPLICATION

This application claims the benefit under 35 USC § 119(e) of the U.S. provisional patent application Ser. No. 62/652,503, filed Apr. 4, 2018, and the same is incorporated in its entirety.

BACKGROUND OF THE INVENTION

A. Area of the Invention

The invention relates to a composition for use in fixing an automotive head gasket.

B. Prior Art

A number of engine cooling system sealants exist under the trademarks STEEL SEAL, BLUEDEVIL HEAD GASKET, and BAR's HEAD GASKET REPAIR.

Of the above three different methods of engine cooling sealants, the most generally known is the STEEL SEAL product.

The invention relates to a composition for combustible engines and the like for particularly sealing cracks in devices as heating cores, freeze plugs, radiators, cracked or warped head and blown head gaskets. The most common approach generally taken to repair such cracks is to utilize solid particles act as plugs for scaling the cracks. A difficulty with this conventional approach is that it is applicable only to large cracks with varying effectiveness but is not effective with respect to very small cracks which are too small for the particle to enter. Another disadvantage with such conventional techniques is that such techniques operate too slowly.

Cooling system devices that dissipate heat generated by burning of fuel compulsorily exist in internal combustion engines. All the engines that use gas, kerosene, gasoline, and diesel as fuel belong to the internal combustion engines. For example, the cooling system of an automobile uses coolant solution composed mainly of glycols, and excessive overheating of engine by leakage and depletion of coolant by any means can shorten durability of the engine and cause metallic cracks on the engine parts.

Cracks, openings, and microscopic holes on a radiator, cylinder block, cylinder head, and cylinder head gasket participating in cooling of internal combustion engines, cause waste of unnecessary resources and economical defrayment of consumers when no other methods are available but replacing the relevant parts as the sole solution.

There have been efforts to repair cracks of internal combustion engines without disassembling and replacing damaged devices, and several products are commercialized and marketed. One such representative example of using sodium silicate, main ingredient of majority of currently marketed crack repairing products, can be found in U.S. Pat. No. 4,708,195 (1987). Sealing formulation of 95.8% sodium silicate, 4.1% water, 0.16% cupric sulfate pentahydrate, and 0.005% arabic gum has been disclosed. In another U.S. Pat. No. 4,765,629 (1988) described a sealing system composed of a liquid carrier and solid particles, a liquid carrier composed of water and sodium silicate, and solid particles selected from silver solder flakes, lead solder flakes and pure ground pepper, and solidifying at 150 degree. F. in the crack.

In still another application, U.S. Pat. No. 4,973,360 (1990) expanded on the kinds of silicates in addition to sodium or potassium silicate already in use, and disclosed a sealant solution composed of 25% water, 25% ethylene glycol, and 50% aqueous solution composed of compounds selected from silicates of lithium, ammonium, rubidium, cesium, and germanium, and oxides of sodium oxide with aluminum oxide, calcium oxide or magnesium oxide. Synthetic polymer polyacrylic acid was first described in U.S. Pat. No. 6,767,395 (2004). In that application, a liquid aluminum stop-leak formulation using water, polyacrylic acid, cellulose fibers of 0.075-0.3 mm, polyester fiber of 0.3 mm, aluminum particles of about 320, and other components are disclosed. In U.S. Pat. No. 6,840,990, a sealing composition incorporating sodium nitrate or azoles as corrosion inhibitors is described.

Further prior art of the above type are known as U.S. Pat. No. 6,159,276 (2000) to Barks; U.S. Pat. No. 6,324,757 (2001) to Barks; U.S. Appln. Pub. 2008/0087195 (2008) to Yoon; U.S. Pat. No. 6,647,622 (2003) to Hipple, et al; U.S. Pat. Pub. No. 2011/0042902 A1 to Herior-Watt Univ., and U.S. Pat. No. 7,749,560 (2010) to Bell for Blue Magic, Inc.

Such compositions are known by their kinematic viscosity, one of the aspects is its thickening effect thereof.

SUMMARY OF THE INVENTION

A 16 fluid ounce composition for sealing warped or cracked head gasket consisting of:

4.7 fluid ounces of sodium silicate; 3 fluid ounces of potassium silicate; 2.2 fluid ounces of propylene glycol pH 8-10; 4.6 fluid ounces of water; 1.0 ounces of citric acid (2) $H_2 C_6 H_5 O$ and 0.5-ounce of o-hydroxy phenyl triazine. The propylene glycol may be toxic. Also, one may also include 0.5 ounce of green dye (triarylmethane).

The present sealant is a system for repairing for a combustible engine.

In accordance with one embodiment of this invention, the sealing system includes a liquid carrier for solid particles. Unlike the conventional systems, however, the liquid carrier itself is capable of coagulation and solidification. Thus, the invention utilizes the advantages of the prior techniques by initially closing large cracks and openings with the solid particles and utilizing the liquid to fill the tiny cracks and to complete the filling of the large cracks upon solidification of the liquid.

In another embodiment of this invention, the sealant may use a mixture of sodium silicate, potassium silicate, a glycol, and particulates, with optional coloring agents and preservatives.

An object of the invention is to provide an improved sealing system which has the advantages but not the drawbacks of the above system.

A further object of this invention is to provide such a sealing system which provides sufficient strength and durability to effectively withstand pressure that might be applied.

A still further object of this invention is to provide such a system which is characterized by its quickness in sealing cracks regardless of the size of the cracks.

The above and yet other objects of the present invention will become apparent from the hereinafter set forth in the Detailed Description of the Invention, and Claims appended herewith.

DETAILED DESCRIPTION OF THE INVENTION

The present invention provides a composition for sealing holes or cracks in engine cooling systems effectively and for sealing warped engine heads. The invention provides a method and liquid composition which may be solidified to seal cracks, holes, and warped areas. The solid particles function as bonding agents to which the liquid becomes attached while solidifying. The solidification of the carrier takes place such that a reactant or catalyst is added to the liquid carrier immediately after time of insertion, thereby causing a chemical reaction to form solidification. In the preferred form of the present invention, solidification takes place as a result of heat applied to the liquid carrier.

By utilizing heat to cause solidification, the invention particularly is useful for sealing cracks or holes in a combustion engine in its cooling system. For example, the invention is utilized for sealing cracked or warped heads or blown head gaskets in an engine or for sealing heating cores, freeze plugs, radiators or otherwise in the cooling system. In one aspect, the engine or cooling system is a gasoline or diesel type such as those used in vehicles such as cars, trucks, and boats.

In the present invention, a liquid part of sealant is obtained by mixing sodium silicate and potassium silicate in liquid form, to which is added a glycol and water. In one aspect, the liquid contains various coloring agents and preservatives. In some applications, the liquid contains particulates such as pumice or corrosion-resistant metal filings.

The silicates of the present composition include potassium silicate and sodium silicate. The silicates are high grade silicates and may be mixed in specific proportions. For example, sodium silicate may be present in 30% volume based on the total amount of the silicates, more preferably 30-60% volume. Thus, the total amount of silicates comprises about 30%-60% volume of the aqueous silicate mixture.

Sodium silicate or water glass may be pure sodium metasilicate or mixtures of sodium metasilicate with two other silicates. It is available as granular, crystals, or 40% Baume solution. The N Grade liquid is preferred.

Sodium silicate is a term applied to a group of materials. They are compositions in which sodium oxide is combined with various amounts of silica, usually with some water. They differ in $SiO_2/Na_2 O$ ratio and in the amount of water attached. Sodium silicates are available in $SiO_2/Na_2 O$ from 0.5 to 4. The number of water molecules per one molecule of sodium silicate varies from 0 to 10.5.

The silicate mixture of the present invention is provided in liquid form. The potassium silicate of the present invention may be $K_2 SiO_3$, $K_2 SiO_5$, and/or $K_2 Si_4 O_9$. Preferably, the potassium silicate is present in liquid form, such as solubilized in water, based on the total amount of silicates, more preferably, 30-60% based on the total amount of silicates. The balance being comprised of sodium silicate.

The composition also contains a glycol in water. Suitable glycols for use in the invention include diethylene glycol, ethylene glycol, propylene glycol, dipropylene glycol, polyglycols, glycol ethers, and mixtures of diethylene glycol, ethylene glycol, propylene glycol, dipropylene glycol, polyglycols, and glycol ethers. In one aspect, diethylene glycol is preferred. Glycols provide a composition with a low freezing point and lubrication for the water pump. A composition containing about 12-15 vol. % glycol, for example, is used in climates with temperatures down to about −10 degree. F. (about −23. degree. C.). In a preferred embodiment of the invention, the glycol component comprises 1-25 vol. % of the composition. More preferably, the diethylene glycol and water comprise 10%-20% of the total composition. Most preferably, the diethylene glycol and water comprise 20%-35% volume of the total composition. The diethylene glycol is particularly advantageous since this additive allows for a cooler running system and helps the thickening effect of the sealant.

In Composition I of the inventive composition of 16 fluid ounces or about 480 ml includes about:
  4.6 fluid ounces of water (about 28%)
  4.7 fluid ounces of sodium silicate (about 29%).
  3 fluid ounces of potassium silicate (about 18%).
  2.2 fluid ounces of toxic propylene glycol at pH 8 to 10 (about 14%).
  1.0 ounce of citric acid (2) $H_2 C_6 H_5 O$ (7.5%).
  0.5-ounce of o-hydroxy phenyl triazine (3.75%).

Also, toxic propylene glycol is substantially the same as Prestone low-toxic, but operates as a coagulative or swelling basis, i.e., a thick-like sealant used in head gasket failures, i.e., under 10 durometers.

One must note that head gasket failure is a symptom, not a cause of overheating. The original source of cooling system failure, if still present, must be repaired before attempting to repair your head gasket.

In composition II, for sealing, warped or cracked head gasket coolant consisting essentially of:
  (a) 25% to 30% by volume of water;
  (b) 26% to 32% by volume of sodium silicate;
  (c) 15% to 21% by volume of potassium silicate;
  (d) 12% to 16% by volume of propylene glycol by pH 8-10, said glycol is selected from the group consisting of diethylene glycol, ethylene glycol, propylene glycol, dipropylene glycol, polyglycols, glycol ethers, and mixtures thereof;
  (e) 5% to 10% by volume of citric acid ($H_2, C_6, H_5 0$); and
  (f) 2.5% to 5% by volume of o-hydroxy phenyl triazine.

The formulation as recited above, which includes benzoates, molybdates, alkali metal borates, sodium silicates, potassium silicates, triazoles, acids, boric salts, sodium hydroxides, potassium or hydroxides, or lithium hydroxides.

The formulation also recited further may include about 0.5 ounces of green dye (triarylmethane).

An example thereof such as a thick-like sealant include an aqueous media comprise a triazole, a benzoate or a silica from 0.1-0.3 weight percent of a hydrocarbyl triazole, preferably benzotriazole or tolyltriazole. Additionally, such corrosion inhibitors which may optionally be employed in admixture with the corrosion-inhibited antifreeze concentrate or aqueous antifreeze formulation of the instant invention are alkali metal hydroxides silicates, nitrates, benzoates, and molybdates, or combinations thereof, in a concentration rate of 0.1-5.0 weight percent.

Aqueous non-phosphate corrosion inhibited antifreeze formulations of the instant invention are those where the antifreeze concentrate of the instant invention is diluted with 10-30 volume %, or preferably 20-40 volume % of water. The antifreeze concentrate and aqueous antifreeze composition of the instant invention exbibit a synergistic resistance to corrosion for a variety of metals in comparison with compositions containing either the monobasic acid or salt or alkali metal borate components described above.

Problems such as Steel Seal of Warwickshire, UK is not compatible with all antifreeze formulations. Therefore, for best results, coolant should be temporarily drained and replaced with fresh water. Once repaired, drain the mixture from the cooling system and replace with 50/50 antifreeze.

Water in Oil

If water is present, you must change the oil and filter before proceeding.

Change oil and leave one quart low. Add last quart after the repair is complete.

Repair Guidelines

Recommended Dose:
4 cylinder engine—1 Bottle (4 Cylinder Kit)
6 cylinder engine—2 bottles (6-8 Cylinder Kit)
8 cylinder engine—2 bottles (6-8 Cylinder Kit)

Blown Head Gasket Repair in Three Steps:
1. Make sure engine is cold and remove the radiator cap. Pour the seal formulation directly into the radiator. Replace radiator cap and tighten.
2. If vehicle is roadworthy: Start engine and drive at freeway speeds for 5 miles, maintaining between 3,000-4,000 rpm, then shut off engine. If vehicle is not roadworthy: Turn heater and fan to maximum. Start engine, run to operating temperature and then run on high idle (1,000-1,500 rpm) for 30 minutes.
3. Turn off vehicle and allow to cool completely. Top up with antifreeze/water as necessary, replace radiator cap tightly.

For Best Results:

If you have tried inferior products, flush your cooling system with clean water after disconnecting bottom radiator hose. Do not use a flushing agent.

If you have flushed system, reconnect bottom radiator hose.

Additional for The Directions:

These directions are for people that have a lot of back pressure building up in the cooling system, usually shown as bubbling in the header tank or air forcing past the coolant cap.

Locate the cylinder causing the bubbling in the overflow tank or backpressure. Remove plugs at a time until bubbling stops.

Before starting the engine, remove the spark plug or injector from the cylinder that was causing the bubbling in the overflow tank or back pressure. If accessible, remove injector wire from that cylinder. This will limit the amount of unburned fuel going into the combustion chamber.

If you cannot find the spark plug causing backpressure, run the engine with the coolant level down to the top of the radiator core and with the radiator cap off or leave the expansion cap off the expansion bottle with water only just visible. Make sure to run the engine up to temperature with the spark plug/Injector out and from the one final time with the spark plug/injector back in place. However, if a vehicle is roadworthy, then start the engine and drive at freeway speed of five miles, maintaining between 3,000-4,000 rpm, and then shut off engine.

Prestone conventional green antifreeze—(Ethylene Glycol-pH 8-11) Low solvent effect, silicate stabilizers and high pH provide the best protection.

The invention is also characterized by a seal having excellent strength and integrity sufficient to withstand the normal pressure to which it would be subjected. A particularly great advantage is the quickness or speed in which the sealing action takes place. A further advantage is the ability of such sealant to penetrate tiny cracks and thereby prevent such cracks from getting larger.

In general, the invention applies to sealing any type of cracks wherein liquid may flow into the cracks. As noted above, such cracks would then be effectively sealed in a rapid period of time. The cracks may be in combustible engine cooling systems or may be in other devices such as home or building heating systems.

An advantage of this variation is that it permits the sealing of cracks or leaks at lower temperatures than with the first embodiment. Additionally, the particular mixture of components which includes ethylene glycol permits the provision of antifreeze which is ordinarily already in the engine to function as a source of the ethylene glycol.

The invention in its various embodiments thus provides a sealant which is particularly effective for cracks and leaks at various ranges of temperatures.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

I claim:

1. A formulation for sealing, for use in warping or cracking head gasket and cooling systems, consisting essentially of:
   (a) 20% to 35% by volume of water;
   (b) 20% to 35% by volume of sodium silicate;
   (c) 10% to 30% by volume of potassium silicate;
   (d) 10% to 20% by volume of propylene glycol at pH 8-10;
   (e) 5% to 10% by volume of citric acid; and
   (f) 2.5% to 5% by volume of o-hydroxy phenyl triazine.

2. The formulation as recited in claim 1, wherein said sodium silicate and potassium silicate have a kinematic viscosity.

3. The formulation as recited in claim 2, consisting essentially of:
   (a) 25% to 30% by volume of water;
   (b) 26% to 32% by volume of sodium silicate;
   (c) 15% to 21% by volume of potassium silicate;
   (d) 12% to 16% by volume of propylene glycol by pH 8-10;
   (e) 5% to 10% by volume of citric acid; and
   (f) 2.5% to 5% by volume of o-hydroxy phenyl triazine.

4. A 16 fluid ounce formulation for sealing, for use in warped or cracked head gasket and cooling systems, consisting essentially of:
   (a) about 4.6 fluid ounces of water;
   (b) about 4.7 fluid ounces sodium silicate;
   (c) about 3.0 fluid ounces potassium silicate;
   (d) about 2.2 fluid ounces propylene glycol at pH 8-10;
   (e) about 1.0-ounce citric acid; and
   (f) about 0.5-ounce o-hydroxy phenyl triazine.

5. The formulation as recited in claim 4, wherein said sodium silicate and potassium silicate have a kinematic viscosity.

6. A formulation for sealing, for use in warped or cracked head gasket and coolant systems, consisting essentially of:
   (a) 25% to 30% by volume of water;
   (b) 26% to 32% by volume of sodium silicate;
   (c) 15% to 21% by volume of potassium silicate;
   (d) 12% to 16% by volume of glycol by pH 8-10, said glycol is selected from the group consisting of diethylene glycol, ethylene glycol, propylene glycol, dipropylene glycol, polyglycols, glycol ethers and mixtures thereof;
   (e) 5% to 10% by volume of citric acid; and
   (f) 2.5% to 5% by volume of o-hydroxy phenyl triazine.

7. The formulation as recited in claim 6, wherein said sodium silicate and potassium silicate have a kinematic viscosity.

8. A formulation for sealing warped or cracked head gasket and coolant systems, consisting essentially of:

(a) 25% to 30% by volume of water;
(b) 26% to 32% by volume of sodium silicate;
(c) 15% to 21% by volume of potassium silicate;
(d) 12% to 16% by volume of glycol by pH 8-10, said glycol is selected from the group consisting of diethylene glycol, ethylene glycol, propylene glycol, dipropylene glycol, polyglycols, glycol ethers and mixtures thereof;
(e) 5% to 10% by volume of citric acid;
(f) 2.5% to 5% by volume of o-hydroxy phenyl triazine;
(g) said sodium silicate and potassium silicate have a kinematic viscosity; and
(h) about 3% by volume of triarylmethane, for use as green dye.

* * * * *